3,437,728
PROTRACTED RELEASE PHARMACEUTICAL COMPOSITIONS

Gerhard Renwanz, Karl Credner, and Erika Glantz, Berlin, Germany, assignors to Diwag Chemische Fabriken GmbH.
No Drawing. Filed June 15, 1964, Ser. No. 375,698
Int. Cl. A61k 27/12
U.S. Cl. 424—21                                         14 Claims

ABSTRACT OF THE DISCLOSURE

The sustained release pharmaceutical composition of this invention comprises (a) a compressed core containing the active ingredient embedded in or impregnated with paraffin and being provided with (b) a protective coating composed of a mixture of paraffin and a higher fatty acid, preferably stearic acid, and having incorporated therein a finely divided acid and alkali-resistant mineral material, such as talc, bolus alba, aluminum hydroxide.

Part of the paraffin-fatty acid mixture of the coating may be replaced by acetyl cellulose.

The composition has the advantage over heretofore prepared sustained release compositions that it releases the drug gradually and at a uniform rate during its absorption by the gastro-intestinal tract. Heretofore such gradual release could be achieved only by mixing a number of pellets, pills, etc., of different solubility in the gastro-intestinal fluids whereby each group had to be prepared separately, or by providing a multilayer tablet, pill, or the like whereby the layers were of different solubility in the gastro-intestinal fluids.

---

This invention relates to protracted release pharmaceutical compositions for oral administration.

It is known that the release of the active ingredient from powders, granules, pills, tablets and dragées can be protracted by embedding the active ingredient in a fat, wax, lacquer or plastic material prior to incorporating it in the pharmaceutical composition. This can be accomplished, for example, by suspending the active ingredient powder in a melt or suitable solution of the embedding agent or by spraying it with the melt or the solution. In general, tablets compressed from pulverulent active ingredients impregnated in this manner and the conventional tablet adjuvants do not meet with the requirements of a retarded release tablet. They release the active ingredient either too rapidly or incompletely.

It is also known that tablet cores can be protected from gastric secretions by coating them with a suitable protective layer which is resistant to the acid gastric juice but is dissolved completely or partially in the alkaline environment of the intestine. Among the protective materials proposed are higher fatty acids and waxes as well as many natural and synthetic resins which are applied to the tablet cores in the form of a solution in alcohols and/or acetone and the like with and without the addition of plasticizers and fillers such as talc, metal soaps, kaolin, bentonite and others.

It is indispensable for the preparation of products of this type that the materials used are absolutely non-toxic and well compatible.

The protective coatings thus obtainable resist the attack of gastric juice and, depending upon the selection of the protective materials and the thickness of the coating, are more or less rapidly dissolved or gradually digested by the intestine secretions or remain preserved unattacked as a semi-permeable diaphragm through which a low molecular weight active ingredient can be released slowly. In practice, sufficient resistence to gastric secretions in which the dragée, as is known, resides not longer in most cases than 1 to 2 hours is obtainable with adequate certainty. It is by far more difficult to enforce with such a protective coating a controlled release of the active ingredient to the intestine, e.g. uniformly distributed over 5 to 7 hours since the retarding effect is exclusively due to continuity of the protective coating and its capability to resist for hours the intestine secretions.

It is an object of this invention to provide protracted release pharmaceutical preparations which are characterized in that the active ingredient is embedded in paraffin in a manner known per se and compressed with conventional adjuvants to form tablet cores, or tablet cores containing the active ingredient but being free from paraffin are impregnated with molten paraffin, and the crude cores thus obtained are coated with a protective diaphragm of talc or other acid- and alkali-proof mineral materials and a mixture of paraffin and stearic acid or other higher fatty acids or with acetyl cellulose or mixture of these materials.

Paraffin as the embedding agent was used heretofore only as a minor additive to stearic acid and its mixtures with other fatty acids which have been referred, obviously due to their solubility in the alkaline intestine secretions. In contrast, pure paraffin in the tablet core is unattackable and serves as a skeleton substance permitting protraction of the release from the core of water-soluble active ingredients and tablet adjuvants. The achievable delay of the release of the active ingredient is unsatisfactory even when using paraffin. It is possible either by an increase in the amount of paraffin and/or in the compression pressure used in preparing the tablets to protract the release of the active ingredient sufficiently during the first hours, but at the expense of the final release during the last hours which is delayed beyond the degree desired (first type cores), or the amount of paraffin and/or the compression pressure are reduced to give cores which release the active ingredient within a much shorter period of time, e.g. within four hours rather than within eight hours (second type cores). For example, cores of this type release as much as 58% of the active ingredient as early as after one hour, 83% after two hours and 94% of the amount of active ingredient after four hours.

It is of no consequence for the moderate retarding effect offered by impregnation of the active ingredient in the core whether the pure active ingredient is previously embedded in paraffin and then mixed with lactose or the like and compressed or whether a core without paraffin, but with all other adjuvants is subsequently impregnated by applying a melt of paraffin.

Uniform release of the active ingredient from the core can be obtained in a surprisingly simple and economic manner by coating second type cores with a skeleton layer which substantially consists of talc or a similar acid- and alkali-resistant mineral material and a mixture of paraffin and stearic acid and/or other higher fatty acids as bonding agent. For example, release of the active ingredient at a rate of 15% per hour on an average is achieved if second type cores having a weight of 160 mg. are moistened with a few coatings each consisting of 3 mgs. of a 1:1 mixture of paraffin and stearic acid dissolved in methylene chloride or another suitable solvent and each core is dusted immediately thereafter with 18 mg. of talc. The release of the active ingredient can be controlled conveniently by reducing or increasing the amount of talc.

The use of talc as an additive to enteric coating compositions for tablets is already known. However, in all these cases, talc serves only the improvement of the mechanical properties of the protective coating proper, uniform distribution of this filter being very essential. In contrast, the talc applied in accordance with the invention is an essential ingredient of the protective coating and does not constitute a continuous film but forms a relatively irregularly built diaphragm about the core. Surprisingly, completely regular, smooth talc coatings about the impregnated core give by no means the same let alone an improved retarding effect.

If an acid- and alkali-resistant actyl cellulose coating is used in the physiological area, this coating assumes part of the function of the paraffin-stearin-talc diaphragm and, in addition, improves the mechanical strength of the dragée core.

More uniform impregnation is accompanied by improved mechanical strength of the dragée core. It can be measured by determining the disintegration period of a tablet core in a conventional tablet disintegration tester. When applying about 1 mg. of acetyl cellulose, prolongation of the disintegration time in the order of one hour is in fact found.

It is to be understood that active ingredients to be released immediately in the stomach or intestine can be applied in known manner to the retarded release core prepared in accordance with the invention.

The following examples are given by way of illustration and not limitation.

Example 1

An active ingredient (1 kg.) which is soluble in water and insoluble in paraffin is added to the same amount of molten paraffin, kneaded with about ten times the amount of lactose, granulated in conventional manner and tabletted after addition of about 1 kg. of talc. The resulting crude cores are provided, in a coating drum, with a protective coating of talc which is dusted in portions to the cores which are previously wetted with a solution of a 1:1 mixture of paraffin and stearic acid in methylene chloride. A total of about 1.4 kgs. of talc is applied to the surface of the tablet cores by means of about 260 gms. of paraffin-stearic acid mixture.

Example 2

If, on a dragée core of 160 mgs. coated in accordance with Example 1 with a diaphragm of 1:1 paraffin-stearic acid mixture and 18 mgs. of talc, one third of the amounts given above of paraffin, stearic acid and talc is replaced by about 1–1.5 mgs. of acetyl cellulose, the mean error of the individual measurement is reduced to about one half. While 7.2±1.0 mgs. of the total amount of active ingredient of 15.0 mgs. contained in the core are, for example, released to the gastric juice within the first three hours when using no acetyl cellulose, rates of about 6.9±0.5 mgs. are found when using acetyl cellulose. Reliable reduction in the spread requires uniform application of acetyl cellulose from a sufficiently diluted solution (maximum, 5%). Examples of suitable solvents include methylene chloride and tetrachloroethane.

Example 3

0.890 kgs. of m-hydroxyphenyl(1)-ethanol(1)-amine-(2)-hydrochloride are added to 1.140 kgs. of molten paraffin. The mass is kneaded with 9.420 kgs. of lactose, granulated in conventional manner with 0.260 kg. of white gelatine and, after addition of 1.280 kgs. of talc, compressed to cores each weighing 160 mgs. The resulting crude cores are alternately moistened in a rotary drum with a solution of a 1:1 mixture of paraffin and stearic acid in methylene chloride and dusted with talc. A total of about 1.4 kgs. of talc is applied to the surface of the tablet cores by means of about 0.260 kg. of paraffin-stearic acid mixture.

The cores thus prepared release the active ingredient at a sufficiently uniform rate averaging 15% per hour.

Example 4

1.080 kgs. of 4-acetoxy-thymoxyethyl-dimethyl-amine hydrochloride are added to 1.010 kgs. of molten hard paraffin. The mass is kneaded with 8.400 kgs. of lactose and 0.850 kg. of pulverulent sucrose, granulated with 0.200 kg. of ethyl cellulose, mixed with 1.300 kgs. of talc and 0.150 kg. of Aerosil and compressed to form cores each weighing 180 mgs. A solution of 0.100 kg. of hard paraffin, 0.087 kg. of stearic acid and 0.070 kg. of lauric acid in methylene chloride is used to apply a retarding protective coating, the skeleton material being 1.4 kgs. of bolus alba.

Additional 0.360 kg. of 4 - acetoxy-thymoxyethyl-dimethylamine hydrochloride for immediate release to the gastro-intestinal canal are applied in conventional manner to the retarded release cores thus prepared.

Example 5

3.250 kgs. of N-p-bromobenzyl-N-α-pyridyl-N'-methyl-N'-ethyl-ethylenediamine hydrochloride are pulverized, sprayed with a solution of 0.600 kg. of hard paraffin in methylene chloride while stirring the powder, mixed with 7.070 kgs. of lactose after evaporation of the solvent, granulated with 0.520 kg. of agar-agar and, after addition of 1.300 kgs. of talc and 0.260 kg. of cetaceum, compressed to form cores each weighing 200 mgs. The resulting crude cores are wetted in a rotary drum with a solution of 0.065 kg. of hard paraffin, 0.040 kg. of stearic acid and 0.025 kg. of palmitic acid in methylene chloride and dusted with a mixture of 0.390 kg. talc and 0.390 kg. of aluminum hydroxide powder. Then 0.100 kg. of acetyl cellulose are applied from a solution in methylene chloride The cores thus prepared show release of the active ingredient advantageously distributed over hours.

What is claimed is:

1. A single unit retarded release pharmaceutical composition consisting of a compressed core of the finely divided active ingredient embedded in paraffin and of tabletting adjuvants, said compressed core being coated with a protective coating composed of alternate layers of paraffin and a higher fatty acid with 12 to 18 carbon atoms followed by layers of a finely divided acid- and alkali-resistant dusting mineral, said protective coating forming a relatively irregular mineral diaphragm about said core.

2. The retarded release pharmaceutical composition according to claim 1, wherein the protective coating is additionally provided with an acetyl cellulose coating.

3. A retarded release pharmaceutical composition consisting of a compressed core produced by adding the finely divided active ingredient to molten paraffin, intimately mixing said two components, the proportion of active ingredient to paraffin being about 1:0.9–1.3, admixing thereto the required amount of tabletting adjuvants, and compressing the mixture to cores containing the active ingredient embedded in paraffin, said compressed core being coated with a protective coating produced by repeatedly alternatively applying a solution of paraffin and a higher fatty acid selected from the group consisting of stearic acid, palmitic acid, and lauric acid in the proportion of about 1:1 in a solvent for said paraffin and higher fatty acid, followed by dusting said coated cores, while still wet, with a plurality of portions of a finely divided acid- and alkali-resistant mineral selected from the group consisting of talc, bolus alba, and aluminum hydroxide in the proportion mineral to paraffin-higher fatty acid mixture of 1:0.12–0.2 to said coating, until a relatively irregular mineral diaphragm is built about the core.

4. The retarded release pharmaceutical composition according to claim 3, wherein the higher fatty acid is stearic acid.

5. The retarded release pharmaceutical composition according to claim 3, wherein the solvent for paraffin and higher fatty acid is methylene chloride.

6. The retarded release pharmaceutical composition according to claim 3, wherein the mineral is talc.

7. The retarded release pharmaceutical composition according to claim 3, wherein the protective coating is additionally provided with an acetyl cellulose coating.

8. The retarded release pharmaceutical composition according to claim 7, wherein the acetyl cellulose coating is applied to the core from a solution of acetyl cellulose, the concentration of the acetyl cellulose therein not substantially exceeding 5%.

9. The retarded release pharmaceutical composition according to claim 7, wherein the acetyl cellulose coating is applied to the core from a solution of acetyl cellulose in a solvent selected from the group consisting of methylene chloride and tetrachloro ethane, the concentration of the acetyl cellulose therein not substantially exceeding 5%.

10. The retarded release pharmaceutical composition according to claim 1, wherein the higher fatty acid is stearic acid.

11. The retarded release pharmaceutical composition according to claim 1, wherein the solvent for paraffin and higher fatty acid is methylene chloride.

12. The retarded release pharmaceutical composition according to claim 1, wherein the mineral is talc.

13. The retarded release pharmaceutical composition according to claim 2, wherein the acetyl cellulose coating is applied to the core from a solution of acetyl cellulose, the concentration of the acetyl cellulose therein not substantially exceeding 5%.

14. The retarded release pharmaceutical composition according to claim 2, wherein the acetyl cellulose coating is applied to the core from a solution of acetyl cellulose in a solvent selected from the group consisting of methylene chloride and tetrachloro ethane, the concentration of the acetyl cellulose therein not substantially exceeding 5%.

References Cited

UNITED STATES PATENTS

| | | | |
|---|---|---|---|
| 2,738,303 | 3/1956 | Blythe | 167—82 |
| 2,853,420 | 9/1958 | Lowey | 167—82 |
| 2,897,121 | 7/1959 | Wagner | 167—82 |
| 2,928,770 | 3/1960 | Bardani | 167—82 |
| 2,991,226 | 7/1961 | Millar et al. | 167—82 |
| 3,080,294 | 3/1963 | Shepard | 167—82 |
| 3,081,233 | 3/1963 | Enz et al. | 167—82 |
| 3,383,283 | 5/1968 | Brindamour | 167—82 |

FOREIGN PATENTS 109,438  1/1940  Australia.

ELBERT L. ROBERTS, *Primary Examiner.*

S. K. ROSE, *Assistant Examiner.*